United States Patent
Etchebehere Juan et al.

(10) Patent No.: US 11,477,346 B2
(45) Date of Patent: Oct. 18, 2022

(54) COLOR CALIBRATION IN A PRINTING SYSTEM

(71) Applicant: HEWLETT-PACKARD DEVELOPMENT COMPANY, L.P., Spring, TX (US)

(72) Inventors: Sergio Etchebehere Juan, Sant Cugat del Valles (ES); Peter Morovic, Sant Cugat del Valles (ES); Jan Morovic, London (GB); Hector Gomez Minano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/311,174

(22) PCT Filed: Jan. 10, 2019

(86) PCT No.: PCT/US2019/013041
§ 371 (c)(1),
(2) Date: Jun. 4, 2021

(87) PCT Pub. No.: WO2020/145976
PCT Pub. Date: Jul. 16, 2020

(65) Prior Publication Data
US 2022/0030134 A1 Jan. 27, 2022

(51) Int. Cl.
*H04N 1/60* (2006.01)
*H04N 1/407* (2006.01)
*G06K 15/02* (2006.01)

(52) U.S. Cl.
CPC ....... *H04N 1/6019* (2013.01); *G06K 15/1878* (2013.01); *H04N 1/407* (2013.01)

(58) Field of Classification Search
CPC ... H04N 1/6019; H04N 1/407; G06K 15/1878
See application file for complete search history.

(56) References Cited

U.S. PATENT DOCUMENTS 6,447,882 B1 9/2002 Sunderrajan
7,652,806 B2 1/2010 Schweid et al.
(Continued)

FOREIGN PATENT DOCUMENTS

DE 102016218293 4/2017
EP 2899964 A2 7/2015
WO WO-2017184151 10/2017

*Primary Examiner* — Quang N Vo
(74) *Attorney, Agent, or Firm* — HP Inc. Patent Department (57) ABSTRACT

Certain examples described herein relate to adjusting a printing system. In certain cases, a lookup table, LUT, is obtained where the lookup table comprises a plurality of nodes that map a plurality of input first color space values to a plurality of Neugebauer Primary area coverage, NPac, vectors in a second color space and each NPac vector comprises at least one Neugebauer Primary, NP. Each NPac vector in the LUT is adjusted by the determination of a colorimetric value of the NPac vector and the modification of the NPac vector based on a characteristic of the corresponding at least one NP and the colorimetric value such that the modification is specific to the NPac vector. The lookup table is updated with the modified NPac vector and stored for referral by the printing system in any future printing.

15 Claims, 5 Drawing Sheets

(56) References Cited

U.S. PATENT DOCUMENTS

| | | | |
|---|---|---|---|
| 8,106,972 B2 | 1/2012 | Vakrat et al. | |
| 8,542,915 B1 | 9/2013 | Andree et al. | |
| 8,593,692 B2 | 11/2013 | Chen et al. | |
| 8,693,050 B2 | 4/2014 | Mestha et al. | |
| 9,466,260 B2 | 10/2016 | Higgins | |
| 9,626,607 B2* | 4/2017 | Morovic | G06T 5/00 |
| 2014/0063515 A1 | 3/2014 | Sugita | |
| 2016/0057314 A1* | 2/2016 | Morovic | G06K 15/1878 358/3.23 |

* cited by examiner

COLOR CALIBRATION IN A PRINTING SYSTEM

BACKGROUND

A printing system may include a plurality of different color printing fluids or colorants. By overprinting images for each of the printing fluids or colorants, an image with a range of different colors can be printed. An example printing pipeline may be calibrated so that printed colors are similar to or match desired colors, such as those defined in a digital format. For example, desired color data for an image may be represented in a Red, Green, Blue (RGB) color space.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*—CIELAB or 'LAB') color space, in which three variables represent lightness (L*) and opposing color dimensions (a* and b*); the Yu'v' color space, in which three variables represent the luminance (Y) and two chrominance dimensions (u' and v')' and the IPT color space, in which the three variables represent a lightness dimension (I), a red-green dimension (P), and a yellow-blue dimension (T).

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). A multi-level printer may use a piezo-electric or thermal print head that is capable of depositing different numbers of drops or different drop volumes, and/or may use multiple passes of a print head, to enact different drop states. For example, if a multi-level printer uses CMY printing fluids with four different drop states ("no drop", "one drop", "two drops" or "three drops"), available NPs can include C, CM, CMM, CMMM, etc. A "drop sequence" as used herein may define a set of drop states used or useable by a given printing system in a given operating state.

An NPac space provides a large number of metamers. Metamerism is the existence of a multitude of combinations of reflectance and emission properties that result in the same perceived color for a fixed illuminant and observer. Multiple NPac vectors in an NPac space may have a similar colorimetry. Several NPac vectors may thus be useable to represent a given color. Different NPac vectors that have similar colorimetry may, however, have differing attributes or properties other than colorimetry.

Each NPac vector may therefore define a probability distribution for colorant or printing fluid combinations for each pixel in the halftone (e.g. a likelihood that a particular colorant or printing fluid combination or available output state is to be placed or defined at each pixel location in the halftone). In this manner, a given NPac vector defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing pipeline that uses area coverage representations for halftone generation is a Halftone Area Neugebauer Separation (HANS) pipeline.

A color lookup table, LUT, may be generated by defining mappings between particular locations in two respective color spaces, and storing the mappings as entries, or "nodes", in a data structure, i.e. the color lookup table. Intermediate nodes in the color lookup table (e.g. entries in the color lookup table corresponding to respective locations in a color space that are between particular locations in the color space that have a defined mapping) may be interpolated based on surrounding nodes that are associated with a defined mapping. For example, a regular sampling (e.g. of $17^3$ or $9^4$ entries) may be taken from the color lookup table and interpolated using an interpolation sequence, e.g. ranging from a simple Delaunay tessellation to more advanced methods.

Such interpolation methods may vary in which surrounding nodes are used to interpolate a given new node, however many use a form of convex combination or barycentric coordinate computation and may therefore produce NPac vectors that use the union of sets of colorant combinations, e.g. NPs, defined by each of the NPac vectors corresponding to the nodes used to interpolate the new node.

In some examples, a HANS lookup table may be populated with NPac vectors that have been modified by application of a generic function across the whole of the LUT. The generic function may be static across the LUT. In other examples, the generic function may change across the LUT based on a desired feature for all the NPac vectors of the LUT, for instance, promoting NPs that have more than one ink overprint, minimizing the blank media coverage, using a bigger penalty over white media in lighter nodes of the LUT, reducing a penalty over darker nodes. However, these strategies for modifying the LUT may provide an image having unsatisfactory image quality.

According to examples described herein, a printing system is adjusted by modifying NPac vectors of an LUT, associated with the printing system, based on a characteristic intrinsic to the respective NPac vectors. For example, the intrinsic characteristic is that of the NPs of each NPac vector, whereby the modification may cause a reduction in colorimetric variation between NPs of a single NPac vector. In one example, the colorimetric value of each NP is compared to the corresponding NPac vector and the NPac vector is modified based on the comparison. Such an approach may reduce contrast between NPs and this may contribute to a lower grain in the print output.

Figure 1:
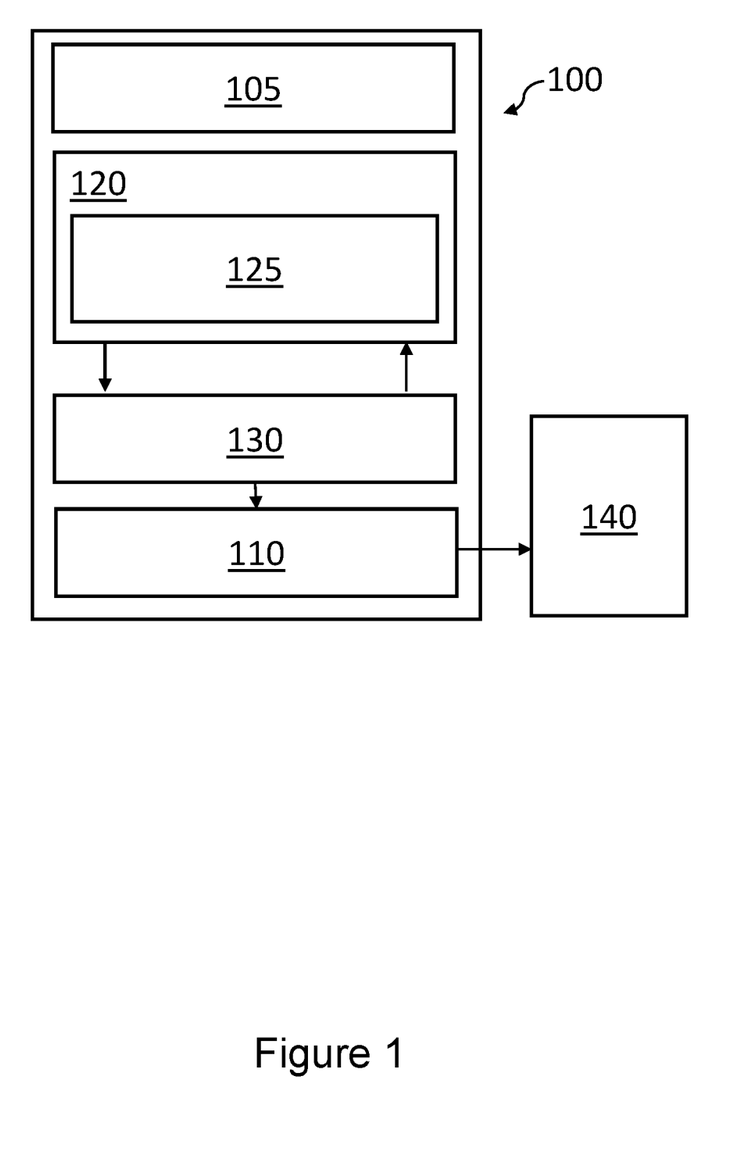
FIG. 1 is a schematic diagram of a printing system according to an example.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise referred to as an additive manufacturing system. In the example of FIG. 1, the printing system 100 comprises a printing device 110, a memory 120 and a processor 130. The processor 130 may be implemented using machine readable instructions and/or be suitably programmed or configured hardware.

The printing device 110 is arranged to apply a print material to a print target in a printing process, to produce a print output 140. The print output 140 may, for example, comprise colored printing fluids deposited on a substrate. The printing device 110 may comprise an inkjet deposit mechanism, which may for example comprise a nozzle to deposit printing fluid on the substrate. The inkjet deposit mechanism may include circuitry to receive instructions associated with depositing printing fluid. The printing device 110 may comprise a multi-level drop-weight printing device. A multi-level drop-weight printing device is a printing device that is configured to deposit printing fluids with more than one possible drop-weight. In 2D printing systems, the substrate may be paper, fabric, plastic or any other suitable print medium.

A printing fluid may be otherwise referred to as a "colorant". A colorant may correspond to a given base color, where other colors may be formed from combinations of colorants. Examples of base colors include, but are not limited to, cyan, magenta, yellow, red, green and blue and black. The number of colorants implementable by the printing system 100 may be less than the number of possible colorant combinations, e.g. NPs, based on the given set of colorants.

In 3D printing systems, the print output 140 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. The fusing agent and detailing agent may control a temperature of a bed of build material. The fusing agent may comprise an energy-absorbing chemical compound that acts to increase a temperature of a portion of build material. The detailing agent may comprise a cooling agent, such as a water-based liquid, that acts to reduce a temperature of a portion of build material. In this manner, a fusing agent may be selectively applied to a layer in areas where particles of the build material are to fuse together, and a detailing agent may be selectively applied where the fusing action is to be reduced. In some examples, the printing agents may comprise colorants and may be deposited on a white or blank powder to color the powder. In other examples, objects may be constructed from layers of fused colored powder.

The memory 120 stores a color lookup table 125 to map between color spaces. For example, the color lookup table 125 may map colorimetric values with vectors in the area coverage space. The color lookup table 125 may map RGB or CMYK color values to NPac vectors, for example. In some examples, the color lookup table 125 maps XYZ, LAB or any other color space used to specify the device color space. Where the vectors comprise NPac vectors, the color lookup table 125 may be referred to as a "HANS lookup table". When an RGB mapping is used, the HANS lookup table may comprise $17^3$ entries. When a CMYK mapping is used, the HANS lookup table may comprise $9^4$ entries. Each NPac vector has at least one colorant combination, namely, an NP, that is printable by the printing system.

The printing system 100 may be able to print more colorants than those in the set of colorants defined by the first plurality of colorant combinations. For example, the set of colorants defined by the first plurality of colorant combinations may be a subset of a complete set of available colorants, wherein the complete set of available colorants defines all colorants printable by the printing system 100.

A colorant may be otherwise referred to as a "printing fluid". A colorant may correspond to a given base color, where other colors may be formed from combinations of colorants. Examples of base colors include, but are not limited to, cyan, magenta, yellow, red, green and blue and black. The number of colorants in a given set of colorants is less than the number of possible colorant combinations, e.g. NPs, based on the given set of colorants.

In some examples, the print controller 130 is arranged to generate a vector in a second colour space, such as an area coverage space, for each colour value in the first colour space, where the vector defines a statistical distribution of colorant combinations over an area of a halftone. In examples, the generated vector is an NPac vector.

In examples, as part of adjusting the printing system 100, the print controller 130 is arranged to determine an updated version of the lookup table 125, based on characteristics of each NP and NPac vector defined therein. For example, the print controller may modify each NPac vector of the lookup table 125 to reduce the colorimetric difference between the NPac vector and its corresponding NPs. In one example, the colorimetric difference is determined by comparing the colorimetric value of an NPac value and the colorimetric values of the related NPs, where any difference is used as a weighting to change the amounts of one or more colorants or combinations thereof and thus, the NPs associated with the NPac vector.

In examples, the print controller 130 is to modify an original NPac vector based on the aforementioned weightings to generate a second NPac vector. The color mapping represented by the color lookup table 125 may be applied to print job data, for example in a printing operation performed by the printing system 100. The modifying of the lookup table may include, in examples, the first vector being adjusted to correspond to the second vector. In other examples, the first vector being replaced by the second vector, e.g. the first vector may be deleted from a memory location and the second vector stored at the memory location.

In one example, the print controller 130 may modify a plurality of, or all, the NPac vectors of a lookup table to generate an updated lookup table. The print controller 130 may then store the updated lookup table for referral by the printing system in any future printing.

Figure 2:
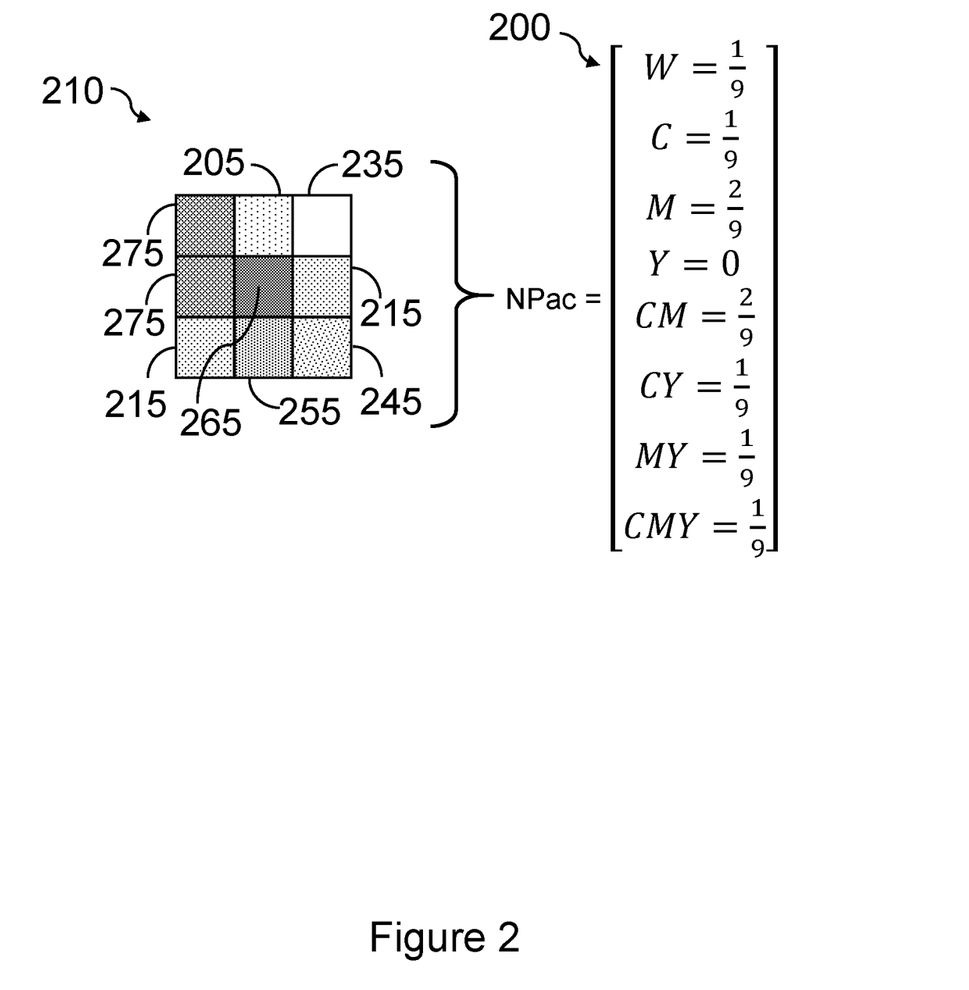
FIG. 2 is a schematic diagram showing a representation of a Neugebauer Primary area coverage vector according to an example.

FIG. 2 shows an example NPac 200 for use in a CMY imaging system. The NPac 200 may correspond to an output color space node derived in accordance with examples described herein. This example shows a three-by-three pixel area 210 of a print output where all pixels have the same NPac: 200. The NPac 200 defines the probability distributions for each NP for each pixel, for example a likelihood that $NP_x$ is to be placed at the pixel location. Hence, in the example print output there is one pixel of White (W) 235; one pixel of Cyan (C) 245; two pixels of Magenta (M) 215; no pixels of Yellow (Y); two pixels of Cyan+Magenta (CM) 275; one pixel of Cyan+Yellow (CY) 255; one pixel of Magenta+Yellow (MY) 205; and one pixel of Cyan+Magenta+Yellow (CMY) 265. Generally, the print output of a given area is generated such that the probability distributions set by the NPac of each pixel are fulfilled. For example, the NPac may be affected by a halftone stage that implements the spatial distribution of colorants combinations defined by the vector, e.g. via a series of geometric shapes such as dots of predetermined sizes being arranged at predetermined angles. As such, an NPac is representative of the colorant overprint statistics of a given area. Although a CMY system is used for ease of explanation, other imaging systems may be used.

Figure 3:
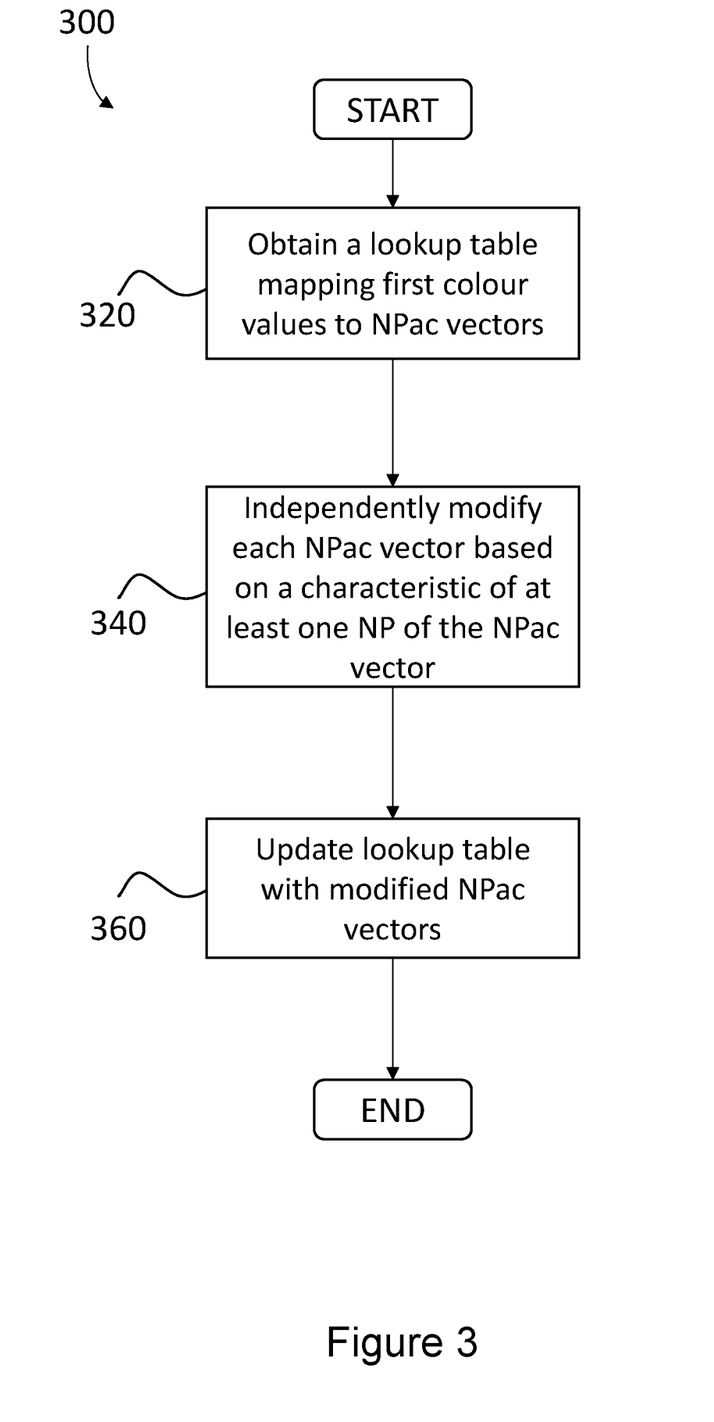
FIG. 3 is a flow chart illustrating a method of adjusting a printing system, according to an example.

FIG. 3 shows a method 300 of adjusting a printing system according to an example. In some examples, the method 300 is performed by a print controller, such as print controller 130 of FIG. 1. The print controller 130 may perform the method 300 based on instructions received from a computer-readable storage medium, such as the memory 120. The printing system may be the printing system 100 of FIG. 1.

At block 320, a lookup table, LUT, for example a HANS lookup table, stored in a memory either comprised in or separate from the printing system is obtained. The LUT has a plurality of nodes that map a plurality of input first colour space values to a plurality of Neugebauer Primary area coverage, NPac, vectors in a second color space. Each NPac vector has at least one Neugebauer Primary, NP, which defines a characteristic of a printing process performed by the printing system. The characteristic may define one or more colorants associated with the printing process, for example, printable colorants. A set of colorants may be combined to give the at least one NP. In one example, the characteristic of the NP may be a colorimetric value, which may be calculated.

At block 340, each NPac vector of the LUT is modified based on the characteristic of the at least one NP of the NPac vector. In one example, such modification is based on the characteristic of the at least one NP relative to a colorimetric value of the NPac vector, so that the modification is specific to the NPac vector. In this way, the modification of each NPac vector is subjective and relates to the specific properties of the NPac, without relying on application of a function that is fixed for the entire LUT or dynamic, but dependent on where the NPac is located in the LUT.

The relationship between the characteristic of the at least one NP and the colorimetric value of the NPac vector may be represented by a weighting, which is applied to the at least one NP to modify the NPac vector. In effect, such modification results in a second NPac vector having a different amount of and/or color combination represented by the at least one NP compared to the original NPac vector. In one example, the weighting may be a numerical value that corresponds to a difference between the colorimetric values of the at least one NP and the NPac vector. In some examples, the weighting causes either an increase or a decrease in the amount of the at least one NP in the NPac vector.

At block 360, the LUT is updated with the modified NPac vectors. In one example, the updated LUT is then stored for referral in any future printing.

The method 300 defines a strategy that reduces contrast between NPs used in an NPac, making the perception of grain smaller. In one example, the updated LUT may be used by a printing system, such as the printing system 100 of FIG. 1, as the basis for applying print material to a print target.

Figure 4:
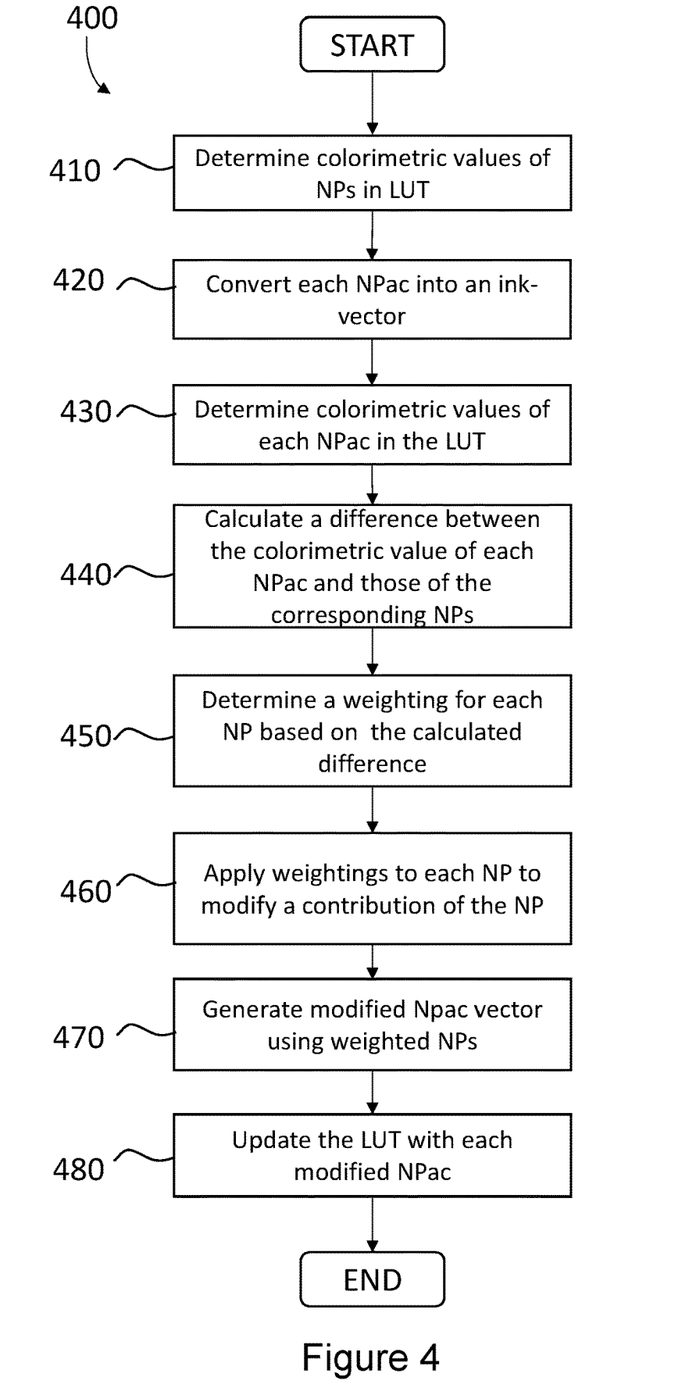
FIG. 4 is a flow chart illustrating a method of adjusting a printing system, according to a further example.

FIG. 4 shows a method 400 of adjusting a printing system according to an example. The method 400 is a more detailed version of the method 300 of FIG. 3.

At block 410, colorimetric values of NPs at each node of a lookup table are determined. In one example, this determination may use a predictive color model based on the NPac or an ink vector. The ink vector represents the proportion of individual inks within the NPac.

At block 420, each NPac vector at each node of the lookup table is converted into an ink vector. Whilst the example depicted by FIG. 4 includes the conversion of each NPac vector into an ink vector after the determination of block 410 and prior to the determination of block 430, in another example, this order may be different. For example, the conversion of block 420 may occur between other steps of the process and may be combined with either of the determination of colorimetric values of NPac vectors using a predictive color model (see block 430 of FIG. 4) or the generation of modified NPac vectors using specific colorimetric weightings (see block 470 of FIG. 4).

At block 430, colorimetric values of NPac vectors at each node are determined. In one example, this determination may use a predictive color model based on the NPac or the ink vector.

At block 440, a difference, sometimes referred to as CIE DOO, between the determined colorimetric value of the NPs and the NPac corresponding to a specific node of the lookup table is calculated.

At block 450, a weighting for each NP is determined based on the calculated difference.

At block 460, the weightings are applied to each NP to modify a contribution of the NP in a second, modified NPac vector that satisfies the ink vector associated with the particular node. In one example, one or more new NPs may be used in the modified NPac vector with a corresponding weighting and, in some cases, one or more of the new NPs may replace one or more NPs of the first NPac vector. As such, the weightings promote NPs that will reduce the contrast within an NPac vector and thereby increase image quality.

At block 470, a modified NPac vector is generated for each node based on the weighted NPs.

At block 480, the lookup table is updated with the modified NPac vectors.

In one example, the method 400 may be applied automatically to each individual NPac in a LUT.

In a further example, the weightings for each NP may be combined with other functions applied to the NP to change a printing process, for example, promotion of NPs that have more than one ink overprint or minimizing blank media coverage. In one example, the other functions may have corresponding weights and such weights may be combined with NPac specific weights to form a unified, single weighting for a particular NP. In one example, the NPac specific weights may be prioritized over the other functions, or vice versa.

As an illustrative example of the method 400, a first NPac vector for a unit area may comply with the following ink vector, where M represents a magenta colorant, B represents a blue colorant; lowercase b represents a drop with a lower weight of blue colorant than those represented by B; lowercase a represents a gray colorant; and N represents a black colorant: M: 91.27%; b: 7.93%, B: 57%, a: 11.54%, N: 8.36%. The first NPac vector may comprise NPs having the following area coverages (A) and differences (DE00) in relation to the colorimetric value of the first NPac, as set out in Table 1:

TABLE 1

| NPs | Area Coverage (%) | DE00 vs NPac |
|---|---|---|
| M | 30.9 | 12 |
| MM | 0.97 | 11 |
| B | 40.29 | 13.3 |
| MMMb | 7.93 | 13.8 |
| MMMa | 11.54 | 17.2 |
| BBN | 8.36 | 28.4 |

Accordingly, the first NPac vector defines the following NPs: M, MM, B, MMMb, MMMa, and BBN.

The differences (DE00) set out above are used as weightings to adjust the NPs associated with the unit area. In some examples, the differences are reviewed to determine a largest discrepancy between an NP of the first NPac and the colorimetric value of the first NPac.

In this example, the largest discrepancy is associated with NP BBN that has a difference of 28.4.

Consequently, any adjustment to the NPs (and thus the NPac) of the unit area may reduce the difference of 28.4.

A second NPac vector is generated based on the identified differences and may comprise NPs having the following area coverages (A) and difference (DE00) in relation to the colorimetric value of the first NPac, as set out in Table 2:

TABLE 2

| NPs | Area Coverage (%) | DE00 vs NPac |
|---|---|---|
| M | 14.19 | 12 |
| MM | 0.97 | 11 |
| B | 57 | 13.3 |
| MMMb | 7.93 | 13.8 |
| MMMa | 11.54 | 17.2 |
| MMN | 8.36 | 15 |

Accordingly, the second NPac vector defines the following NPs: M, MM, B, MMMb, MMMa, and MMN.

The second NPac vector complies with the same ink-vector as the first NPac vector yet has a different distribution of NPs compared to the first NPac vector. Specifically, the second NPac vector uses less pure magenta drops (M) and more pure blue drops (B). In addition, instead of combining the ink-vector defined amount of black ink (N) by combining it with blue (BBN) the second vector uses a combination of magenta and black inks (MMN) which is an NP that is closer colorimetrically to the first NPac vector, as shown by the reduced difference. This results in reduced contrast between the NPs and leads to a distribution of pixels in the unit are having a smaller colorimetric variation, leading to a smoother NPac. This strategy may be applied to each individual NPac in a lookup table to increase image quality of an image that is printed based on the lookup table.

Figure 5:
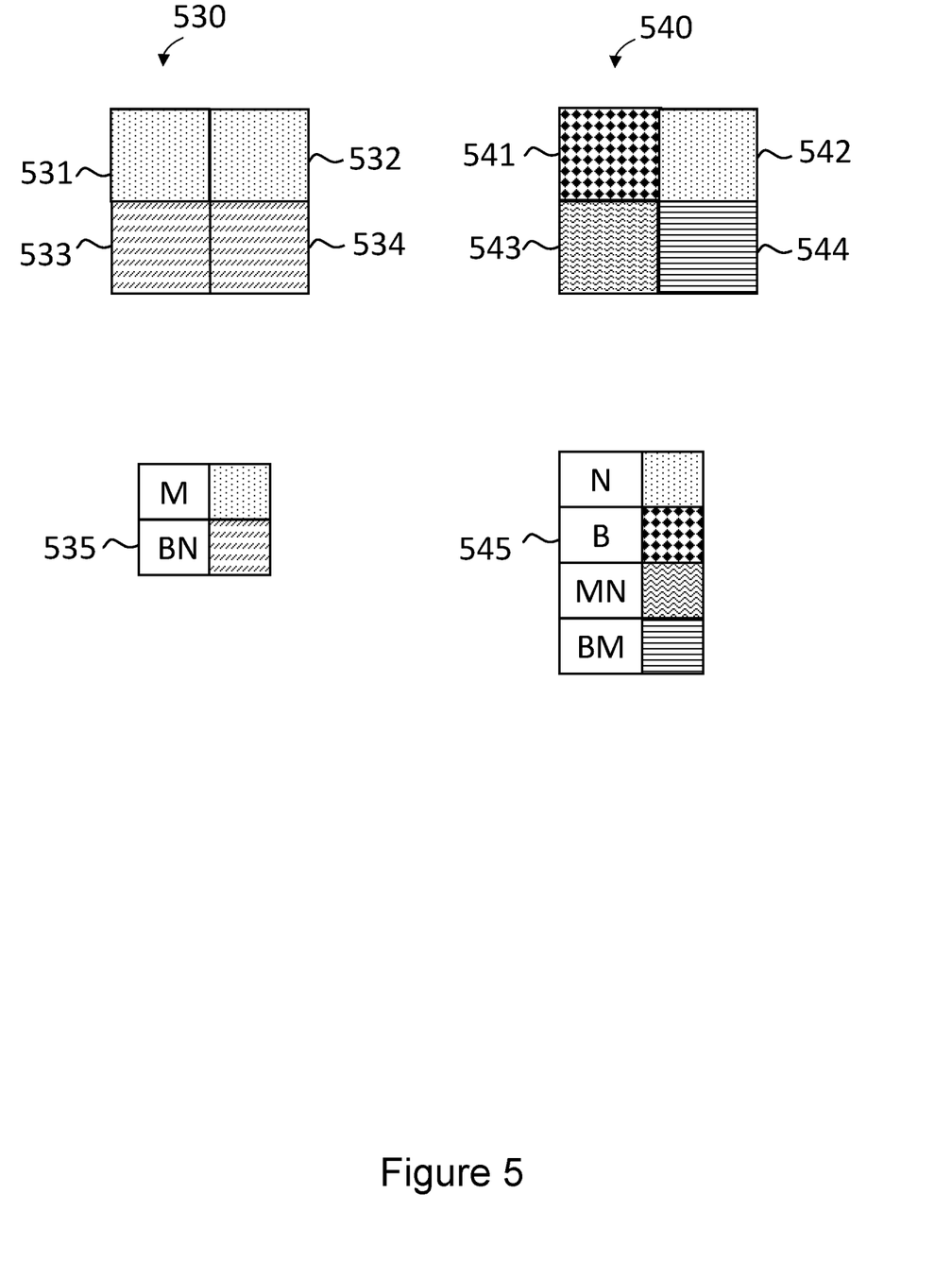
FIG. 5 is a simplified representation of first and second NPac vectors, according to an example.

FIG. 5 is a simplified representation of a first NPac vector 530 and a second modified NPac vector 540 for a two-by-two pixel area for a print output, according to an example. Both the vectors 530 and 540 satisfy the same ink vector but have different weightings of NPs within the pixel area. The NPac vector 540 is an example of a result of method 400 being applied to the vector 530.

In more detail, in the example of FIG. 5, the NPac vectors 530 and 540 satisfy the following ink vector: M (magenta) 50%; B (blue) 50%; and N (black) 50%.

The representation of inks in FIG. 5 are explained with reference to keys or legends 535 and 545. For the vector 530, a key 535 is provided which can be used to determine that the vector 530 has two pixels of magenta: 531 and 532; and two pixels of blue and black overprinted: 533 and 534.

For the vector 540, a key 545 is provided which can be used to determine that the vector 540 has one pixel of black: 542; one pixel of blue: 541; one pixel of magenta and black overprinted: 543; and one pixel of blue and magenta overprinted: 544.

The NP distribution in vectors 530 and 540 is different. For instance, the vector 540 uses no pure magenta drops (M), whereas the vector 530 uses no pure drops of blue (B) or black (N). In this way, the vector 540 uses a combination of magenta and black, magenta and blue, and blue and black inks to satisfy the ink vector, whilst using NPs that are closer colorimetrically to the colorimetric value of the NPac.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of adjusting a printing system, the method comprising:
   obtaining a lookup table, LUT, comprising a plurality of nodes that map a plurality of input first color space values to a plurality of Neugebauer Primary area coverage, NPac, vectors in a second color space, wherein each NPac vector comprises at least one Neugebauer Primary, NP;
   adjusting each NPac vector in the LUT by:
      determining a colorimetric value of the NPac vector;
      modifying the NPac vector based on a characteristic of the corresponding at least one NP and the colorimetric value such that the modification is specific to the NPac vector;
      updating the LUT with the modified NPac vector; and
   storing the updated LUT for referral by the printing system in any future printing.

2. The method of claim 1, wherein for each NPac vector:
   determining a weighting based on a difference between the characteristic of the at least one NP and the colorimetric value of the NPac vector, such that the weighting is an adjustment parameter specific to the NPac vector and reduces the difference between the characteristic of the at least one NP and the colorimetric value of the NPac vector; and
   applying the weighting to the at least one NP.

3. The method of claim 2, wherein the weighting is a numerical value that corresponds to the determined difference.

4. The method of claim 3, wherein the weighting causes either an increase or a decrease in the amount of the NP.

5. The method of claim 1, wherein the modifying comprises adding another, different NP to the NPac vector.

6. The method of claim 1, wherein the characteristic of the corresponding at least one NP is a colorimetric value of the NP.

7. The method of claim 1, further comprising: determining the characteristic of the of the corresponding at least one NP.

8. The method of claim 1, wherein determining the colorimetric value of the NPac vector comprises using a predictive colour model that estimates the colorimetric value based on the NPac of an ink vector associated with the LUT.

9. A print system comprising:
   a printing device to apply print material to a print medium in a printing process;
   a memory arranged to store computer-readable instructions; and
   a processor configured to execute the computer-readable instructions to:
      retrieve a lookup table, LUT, comprising a mapping of first color space to Neugebauer Primary area coverage, NPac, vectors in a second color space, wherein each NPac vector comprises at least one Neugebauer Primary, NP;
      change each NPac vector by modifying the respective at least one NP, wherein the modifying is determined independently from modifications to other NPac vectors and is based on a relative characteristic between the at least one NP and the NPac;
      generate an updated LUT comprising each changed NPac vector; and
      provide the updated LUT to the printing device such that the print material is applied in accordance with the updated LUT to print the image on the print medium.

10. The system of claim 9, wherein the processor is configured to execute the computer readable instructions to:
   determine a weighting based on a difference between the characteristic of the at least one NP and the colorimetric value of the NPac vector, such that the weighting is an adjustment parameter specific to the NPac vector and reduces the difference between the characteristic of the at least one NP and the colorimetric value of the NPac vector; and
   apply the weighting to the at least one NP.

11. The system of claim 10, wherein the weighting is a numerical value that corresponds to the determined difference.

12. The system of claim 11, wherein the weighting causes either an increase or a decrease in the amount of the NP.

13. The system of claim 9, wherein the modifying comprises adding another, different NP to the NPac vector.

14. The system of claim 9, wherein the characteristic of the corresponding at least one NP is a colorimetric value of the NP.

15. A non-transitory computer readable medium comprising a set of instructions, that, when executed by a processor of a printing system cause the processor to:
   obtain a lookup table, LUT, that maps input first color space values to Neugebauer Primary area coverage, NPac, vectors in a second color space, wherein each NPac vector comprises at least one Neugebauer Primary, NP and the NPac vectors form the basis of a printing instruction for the image;
   adjust each NPac vector of the LUT based on a characteristic of the corresponding at least one NP relative to that of the NPac vector, such that the modification of each NPac vector is specific to the NPac vector;
   update the LUT with the adjusted NPac vectors; and
   change the printing instruction for the image based on the updated LUT.

* * * * *